(12) United States Patent
Abdul Jabbar

(10) Patent No.: US 12,505,963 B2
(45) Date of Patent: Dec. 23, 2025

(54) THREE DIMENSIONAL SEPARATOR FOR AN ENERGY DEVICE

(71) Applicant: Nissan North America, Inc., Franklin, TN (US)

(72) Inventor: Mohammed Hussain Abdul Jabbar, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 789 days.

(21) Appl. No.: 17/828,893

(22) Filed: May 31, 2022

(65) Prior Publication Data
US 2023/0402236 A1 Dec. 14, 2023

(51) Int. Cl.
| H01G 11/52 | (2013.01) |
| H01G 11/24 | (2013.01) |
| H01M 50/40 | (2021.01) |
| H01M 50/463 | (2021.01) |
| H01M 50/406 | (2021.01) |

(52) U.S. Cl.
CPC ............ *H01G 11/52* (2013.01); *H01G 11/24* (2013.01); *H01M 50/463* (2021.01); *H01M 50/40* (2021.01); *H01M 50/406* (2021.01)

(58) Field of Classification Search
None
See application file for complete search history.

(56) References Cited

U.S. PATENT DOCUMENTS

| 5,859,761 A * | 1/1999 | Aoki | H01G 11/12 |
| | | | 29/25.03 |
| 2009/0253038 A1 * | 10/2009 | Segawa | H01M 10/044 |
| | | | 100/90 |
| 2013/0017425 A1 * | 1/2013 | Watanabe | H01M 6/42 |
| | | | 29/623.5 |
| 2015/0221450 A1 * | 8/2015 | Hagiwara | H01G 11/26 |
| | | | 429/163 |
| 2018/0034094 A1 * | 2/2018 | Liu | H01M 4/483 |
| 2018/0277882 A1 * | 9/2018 | Sugizaki | H01M 4/139 |
| 2019/0081344 A1 | 3/2019 | Shaffer, II et al. | |
| 2019/0333717 A1 * | 10/2019 | Derfler | H01G 11/70 |

FOREIGN PATENT DOCUMENTS

| CN | 112924434 A | 6/2021 | |
| EP | 0185271 A1 | 6/1986 | |
| EP | 0203657 A2 * | 12/1986 | ............ H01M 10/36 |

OTHER PUBLICATIONS

Zhao et al., "High Performance, Flexible, Solid-State Supercapacitors Based on a Renewable and Biodegradable Mesoporous Cellulose Membrane"; Adv. Energy Mater. 2017, 7, 1700739; DOI: 10.1002/aenm.201700739 (Year: 2017).*

* cited by examiner

*Primary Examiner* — Jessie Walls-Murray

(74) *Attorney, Agent, or Firm* — Young Basile Hanlon & MacFarlane, P.C.

(57) ABSTRACT

A separator for use in a unit cell of an energy device includes a perimeter wall and a step portion extending from the perimeter wall along an inner surface of the perimeter wall. A midpoint of a height of the perimeter wall is aligned with a midpoint of a height of the step portion. A planar membrane extends across an area defined by an innermost surface of the step portion. The planar membrane is aligned with the midpoint of the height of the step portion. The planar membrane includes perforations.

18 Claims, 5 Drawing Sheets

THREE DIMENSIONAL SEPARATOR FOR AN ENERGY DEVICE

TECHNICAL FIELD

This disclosure relates to three dimensional separators for use with energy devices, and in particular, supercapacitors.

BACKGROUND

Energy devices can include multiple thin planar unit cells in a housing, the number of thin planar unit cells determined to provide the necessary energy and/or power required to operate hybrid vehicles, electric vehicles and consumer products, as examples. The design of the components of the energy devices is based in part on 1) keeping the volume of the energy device as small as possible to accommodate the limited space in vehicles and other products; 2) providing mechanical support to the unit cells within the energy device; and 3) providing measures to improve the safety of the unit cells.

SUMMARY

Disclosed herein are implementations of a three dimensional separator for a unit cell of an energy device, the three dimensional separator being a unitary piece that provides mechanical support, sealing of liquid or cell components and ease of production. Also disclosed herein are a supercapacitor unit cell incorporating the three dimensional separator disclosed herein, and a supercapacitor including multiple unit cells having the three dimensional separator disclosed herein.

An implementation of a three dimensional separator for use in a unit cell of an energy device includes a perimeter wall and a step portion extending from the perimeter wall along an inner surface of the perimeter wall. A midpoint of a height of the perimeter wall is aligned with a midpoint of a height of the step portion. A planar membrane extends across an area defined by an innermost surface of the step portion. The planar membrane is aligned with the midpoint of the height of the step portion. The planar membrane includes perforations.

Another implementation of a three dimensional separator for use in a unit cell of an energy device includes a perimeter wall configured to form a seal around edges of layers forming the unit cell, a step portion extending from an inner surface of the perimeter wall, wherein a height of the perimeter wall is greater than a height of the step portion, a planar membrane extending across an area defined by the step portion, the planar membrane aligned with a midpoint of the height of the step portion, the planar membrane having a thickness at least 50% less than the height of the step portion, and perforations in the planar membrane. T separator is a unitary piece of electrically insulating but ionically conducting material.

A supercapacitor unit cell as disclosed herein includes an implementation of the three dimensional separator, wherein the step portion and the planar membrane form a first tray on one side of the planar membrane and form a second tray on an opposite side of the planar membrane and the perimeter wall and the step portion on one side of the planar membrane form a first perimeter ledge, and the perimeter wall and the step portion on another side of the planar membrane form a second perimeter ledge. Positive electrode material and electrolyte are contained in the first tray and negative electrode material and additional electrolyte are contained in the second tray. A mat of carbon fiber reinforced with plastic is supported on each of the first perimeter ledge and the second perimeter ledge.

A supercapacitor is disclosed and includes more than one of the supercapacitor unit cells, a woven glass fiber mat positioned between each pair of adjacent unit cells, a positive electrode tab extending from each of the supercapacitor unit cells between a positive electrode-side mat of carbon fiber reinforced with plastic and an adjacent woven glass fiber mat, and a negative electrode tab extending from the each of the supercapacitor unit cells between a negative electrode-side mat of carbon fiber reinforced with plastic and another adjacent woven glass fiber mat.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

As required, a detailed description of the embodiments is disclosed herein. However, it is to be understood that the disclosed embodiments are merely exemplary of the invention that may be embodied in various and alternative forms. Therefore, specific structural and functional details disclosed herein are not to be interpreted as limiting, but merely as a representative basis for teaching one skilled in the art to variously employ the present invention.

Energy devices, such as battery packs, include multiple unit cells in a housing. The number of unit cells can be in the hundreds for certain applications, such as electric vehicles. Much effort has been put into reducing the size and weight of the individual unit cells while maintaining performance. To better use the available space within vehicles that can accommodate the energy devices, unit cells are being made thinner but covering more planar area. As a non-limiting example, a unit cell may be 100 µm in thickness or less but may have a surface area of a square foot or more. As unit cells decrease in thickness and increase in area, providing mechanical strength to the unit cell, preventing short circuiting along the entire area of the unit cell, and keeping the unit cell as light weight as possible, is increasingly important.

Battery packs are used to provide energy to electric and hybrid vehicles. However, due to material, space, weight and cost constraints, the battery packs do not produce the power that is needed for certain applications. For example, battery packs may not provide enough power to adequately accelerate up a hill or tow a weight behind an electric or hybrid truck.

A supercapacitor can be used to provide power that supplements the energy produced by the battery pack. The supercapacitor weighs less than a secondary battery, generally does not use harmful chemicals or toxic metals, can operate over a wider temperature range, and can be charged and discharged without wearing out. Because the supercapacitor cannot store near the same amount of electrical energy as a battery, the supercapacitor is not a substitute for a battery pack.

Supercapacitors can be used to provide power to a component of the vehicle. The power from the supercapacitor can be provided to supplement the energy from the battery pack when the vehicle is under acceleration. Hybrid vehicles, for example, may supplement battery power with power from a gas engine when a certain amount of acceleration is called for, such as the additional acceleration needed when going uphill. The supercapacitor, providing high power and quick discharge, may supplement the battery power in such a situation, relieving the need for the supplemental power from the gas engine. The use of the supercapacitor in other high power/quick discharge applications is also contemplated herein. Other non-limiting examples of applications for the supercapacitor power generation include regenerative braking, power steering, and towing.

Figure 1:
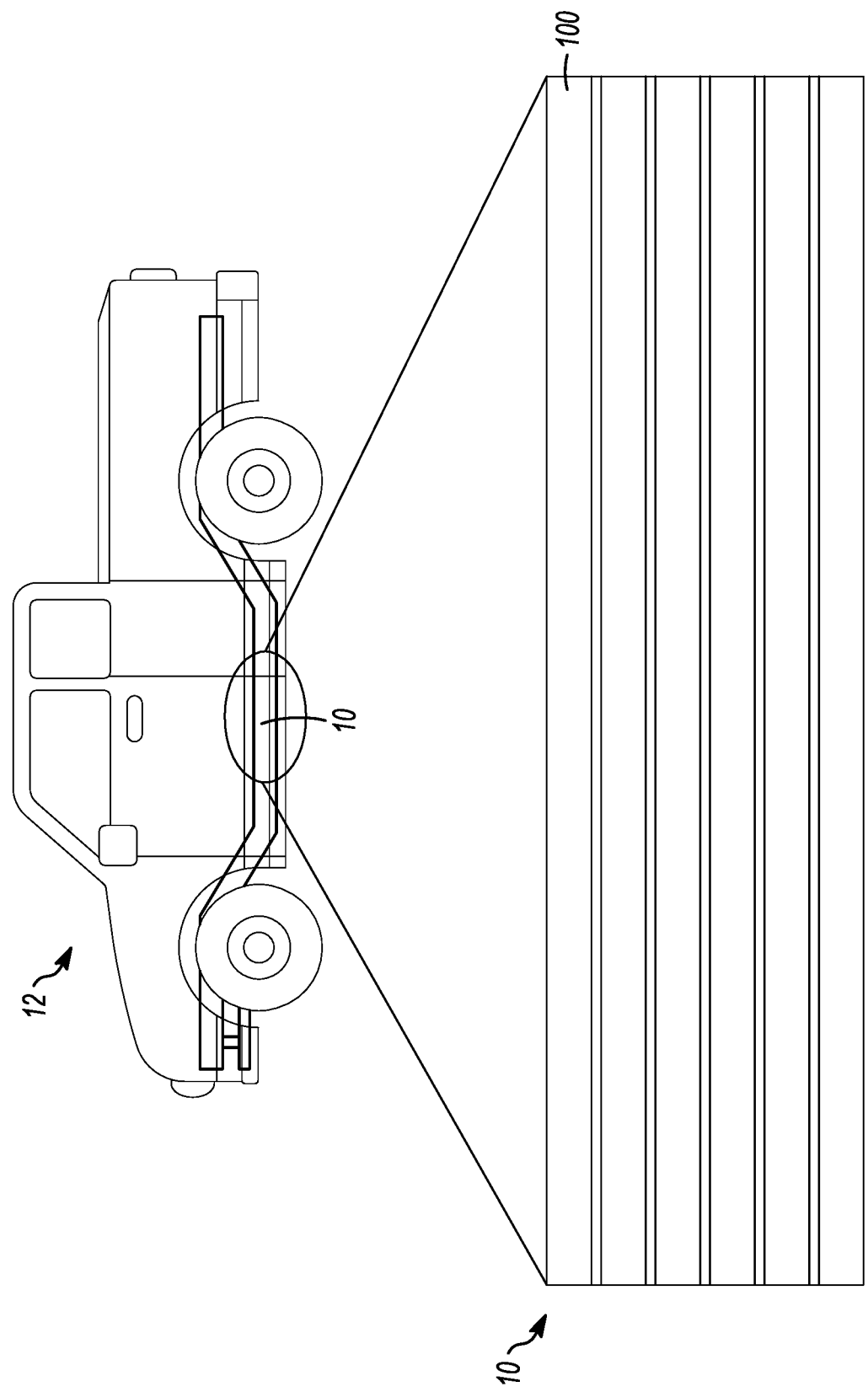
FIG. 1 is a schematic of a vehicle with an energy device, the energy device enlarged to illustrate the stack of unit cells.

The supercapacitor device can be a stack of multiple thin planar unit cells. Any number of unit cells can be stacked. The supercapacitor device can be additional to a battery stack. Alternatively, a unified device can be used. The unified device can be an alternating stack of supercapacitor unit cells and battery cells. The unified device can generate power or energy or both depending on the need of the application. The unified device can be made hybrid as well, for example, meaning that the battery can charge the supercapacitor. FIG. 1 is a schematic of a unified device 10 used in a truck 12. The unified device 10 is enlarged to illustrate the stack of unit cells 100.

Figure 2:
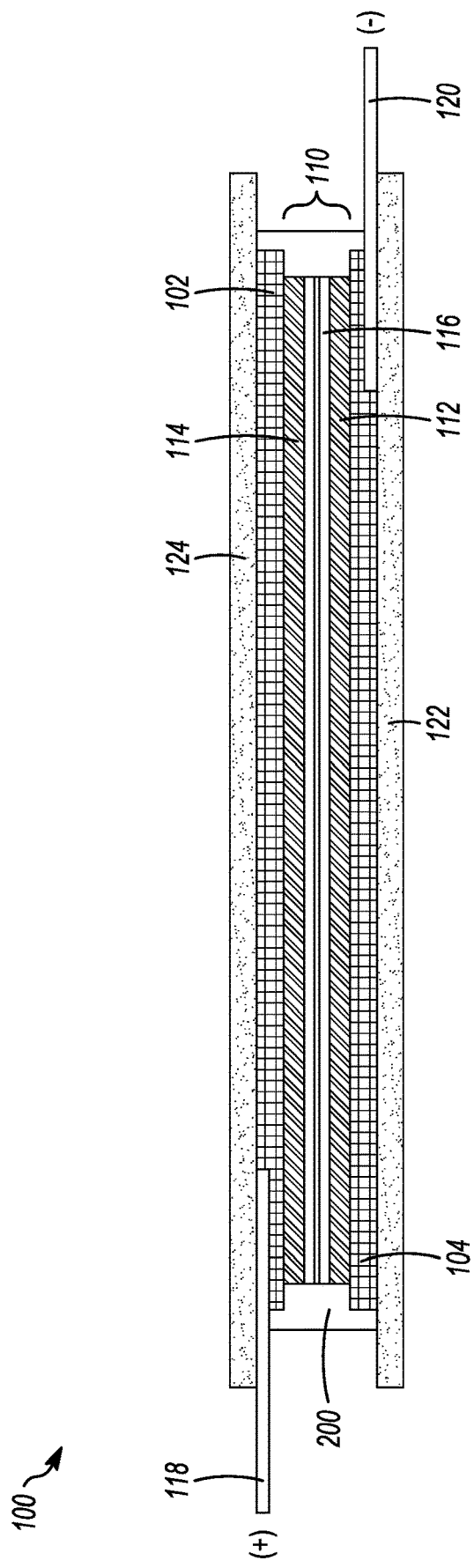
FIG. 2 is a cross-section of a unit cell using the three dimensional separator as disclosed herein.

FIG. 2 is a schematic of a supercapacitor unit cell 100. The supercapacitor unit cell 100 comprises two layers 102, 104 each of carbon fiber reinforced with plastic. The carbon fiber can be a woven carbon mat, as a non-limiting example. The carbon fiber can be impregnated with glass fiber in some embodiments, providing insulating properties while maintaining the shell's conductivity and maintaining the shell's light weight. The plastic can be epoxy, as a non-limiting example. The plastic can be coated on one or both sides of the carbon fiber, thereby impregnating the carbon fiber. The plastic provides the carbon fiber additional mechanical strength, ease of handling, and insulation.

The two layers 102, 104 of carbon fiber reinforced with plastic sandwich an electrode 110 between the two layers 102, 104. The electrode 110 comprises negative electrode material 112, positive electrode material 114, and an electrolyte 116. A three dimensional separator 200 separates the active materials and will be described in detail.

As non-limiting examples, the negative electrode material 112 can be graphite, carbon black, a graphene/polyaniline composite, a vanadium pentoxide ($V_2O_5$)/reduced graphene oxide (rGO) hybrid, 3D graphene foam, 3D graphene/molybdenum disulfide ($MoS_2$) composite, Mxene or Carbon with molybdenum dioxide ($MoO_2$), a polyaniline/cobalt oxide ($Co_3O_4$) composite, 3D nickel nanoparticle nanosheets, nickel-cobalt sulfide nanoflakes on cobalt oxide, and methylimidazole zinc salt (ZIF8) zeolite/multi-walled carbon nanotube (MWCNT)-derived composites. As non-limiting examples, the positive electrode material 114 can be carbon black, activated carbon, 3D graphene, Mxene, and graphene oxide with additives. As non-limiting examples, the electrolyte can be a liquid, polymer or gel electrolyte such as polyvinyl alcohol (PVA) in sulfuric acid ($H_2SO_4$) and polyacrylamide with sodium sulfate ($Na_2SO_4$).

A positive electrode terminal 118, or positive electrode tab, is connected to the carbon fiber of one of the two layers 102, 104 and a negative electrode terminal 120, or negative electrode tab, is connected to the carbon fiber of another of the two layers 102, 104. The positive electrode terminal 118 and the negative electrode terminal 120 are each connected to the carbon fiber of a respective layer so that there is electrical connection between the carbon fiber and the terminals 118, 120. The positive electrode terminal 118 and the negative electrode terminal 120 can each be connected to the carbon fiber before the carbon fiber is reinforced with the plastic so that the plastic does not obstruct the electrical connection between the terminal and the carbon fiber.

Densely woven glass fiber mats 122, 124 sandwich the unit cell 100 to add further mechanical support and electrically separate unit cells. Only one glass fiber mat 122, 124 is needed between adjacent stacked cells.

The three dimensional separator 200 functions to separate the positive electrode material from the negative electrode material, prevent short circuiting of the cell across the entire large surface area of the cell, seal the liquid or gel electrolyte within the unit cell, seal the positive electrode material and the negative electrode materials within the unit cell, position the two layers 102, 104 of carbon fiber reinforced with plastic, provide mechanical support to the unit cell, and increase ease of manufacture of each unit cell.

Figure 3:
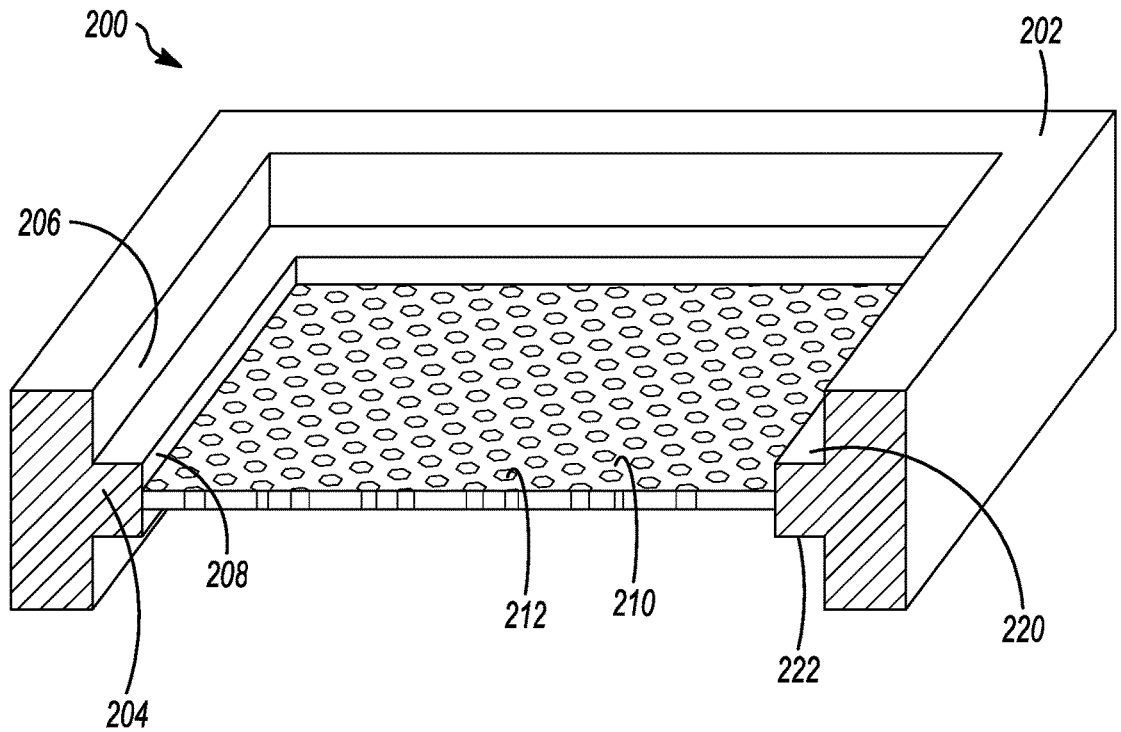
FIG. 3 is a perspective cross-sectional view of an implementation of a three dimensional separator as disclosed herein.
Figure 4:
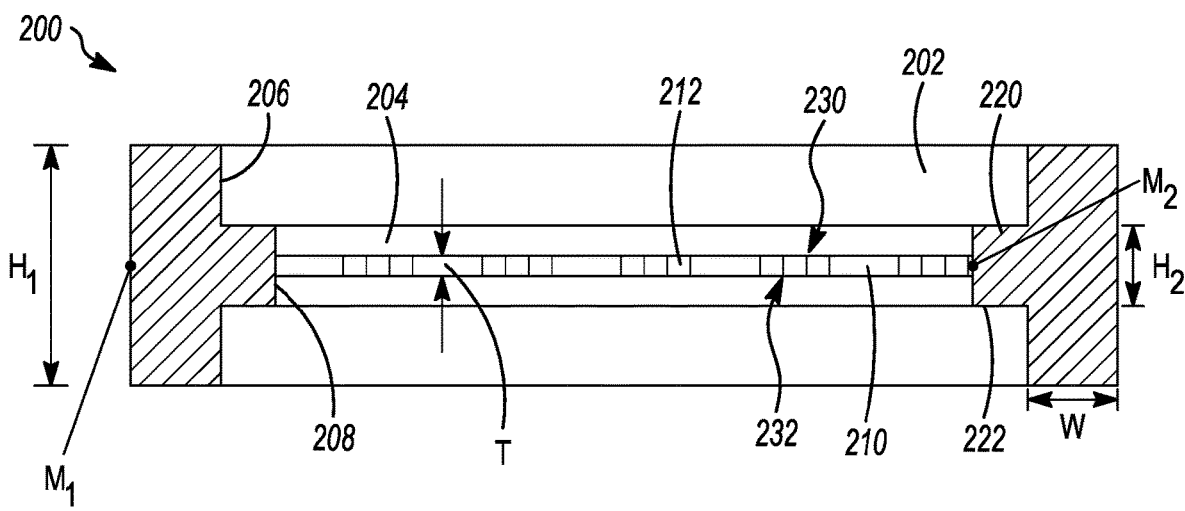
FIG. 4 is a side view of the three dimensional separator of FIG. 3.
Figure 5:
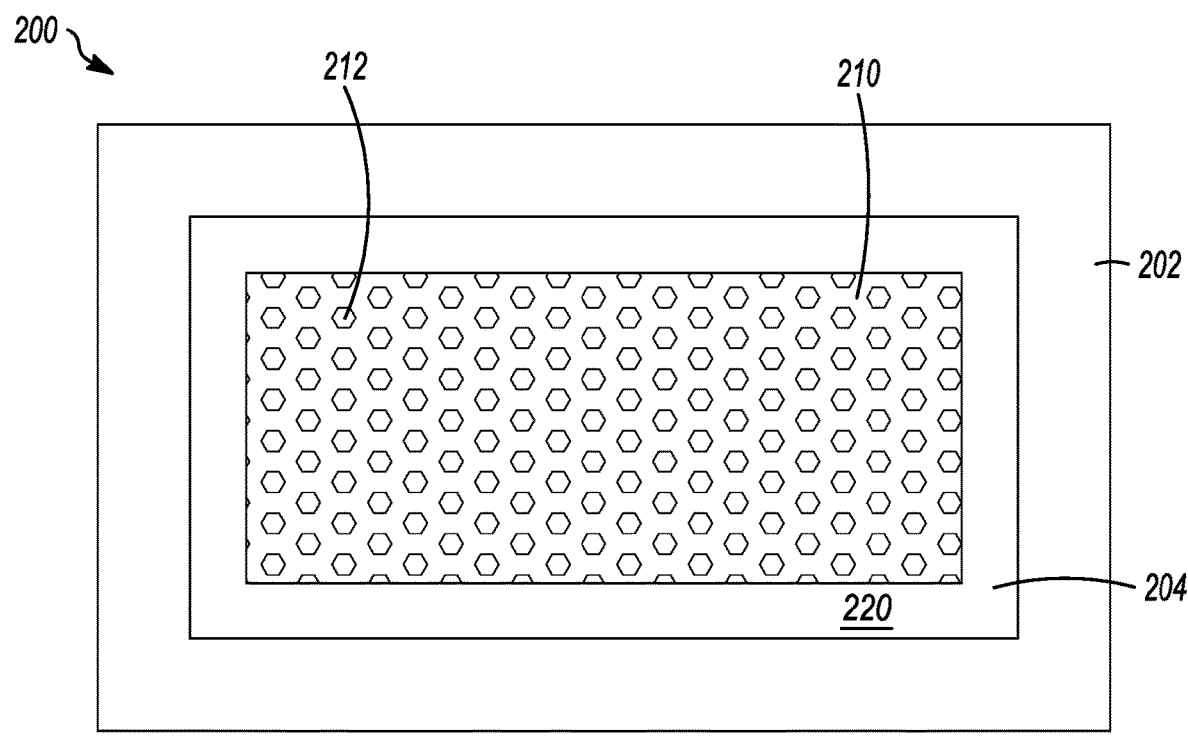
FIG. 5 is a plan view of the implementation of the three dimensional separator of FIG. 3.

FIG. 3 illustrates an implementation of the three dimensional separator 200 as disclosed herein. FIG. 3 is a perspective view of a cross-section of the three dimensional separator 200. A fourth stepped wall is removed for clarity. FIG. 4 is a side view of the three dimensional separator 200 of FIG. 3. FIG. 5 is a pan view of the entire three dimensional separator 200. The three dimensional separator 200 has a perimeter wall 202 configured to extend around all four sides of the unit cell 100. A step portion 204 extends from the perimeter wall 202 along an inner surface 206 of the perimeter wall 202. A midpoint $M_1$ of a height $H_1$ of the perimeter wall 202 is aligned with a midpoint $M_2$ of a height $H_2$ of the step portion 204, alignment of midpoints M1 and M2 being in a perpendicular plane to the height H1 of the perimeter wall 202 and the height H2 of the step portion 204, as shown in FIGS. 2, 3, 4 and 7. A planar membrane 210 extends across an area defined by an innermost surface 208 of the step portion. The planar membrane 210 is aligned with the midpoint $M_2$ of the height $H_2$ of the step portion 204 and the midpoint $M_1$ of the height $H_1$ of the perimeter wall 202. The planar membrane 210 has perforations 212 across its area.

The three dimensional separator 200 is a unitary piece of electrically insulating but ionically conducting material. Non-limiting examples of material from which the three dimensional separator can be made include polytetrafluoroethylene or polypropylene. The three dimensional separator can be made using 3D printing or made using a mold, as non-limiting examples.

The perimeter wall 202 is configured to form a seal around edges of layers forming the unit cell. The height $H_1$ of the perimeter wall 202 can be between 50 μm and 100 μm. The height $H_1$ of the perimeter wall 202 is greater than the height $H_2$ of the step portion 204. The width W of the perimeter wall 202 can be 30 μm or greater. The width W will increase as the planar area of the unit cell increases to provide adequate mechanical strength to the unit cell.

The step portion 204 of the three dimensional separator 200 can have a height $H_2$ of between 15 μm and 35 μm. The perimeter wall 202 and the step portion 204 on one side of the planar membrane 210 form a first perimeter ledge 220 configured to hold a current collector or a mat of carbon fiber reinforced with plastic, and the perimeter wall 202 and the step portion 204 on another side of the planar membrane 210 form a second perimeter ledge 222 configured to hold another current collector or another mat of carbon fiber reinforced with plastic.

The step portion 204 and the planar membrane 210 form a first tray 230 on one side configured to hold electrolyte and negative active material, and form a second tray 232 on an opposite side of the planar membrane 210 to hold additional electrolyte and positive active material.

Figure 6:
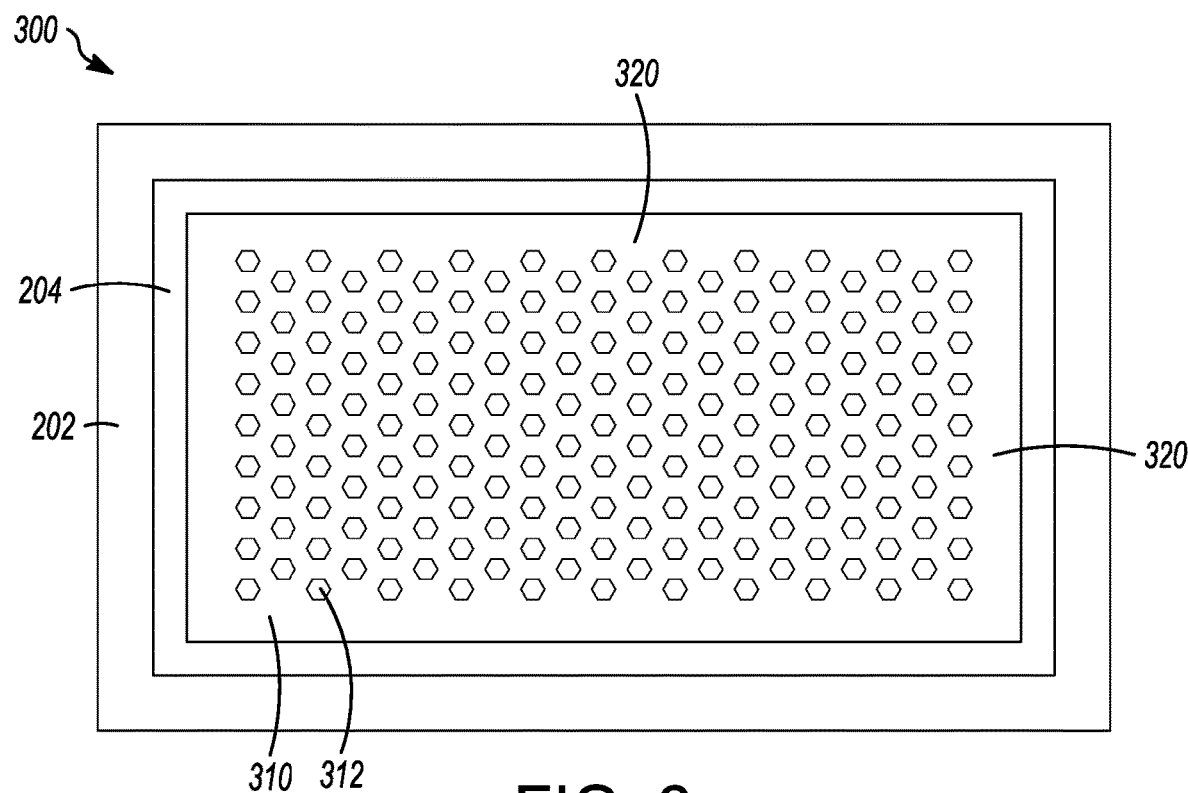
FIG. 6 is a cross-sectional side view of another implementation of a three dimensional separator as disclosed herein.

The planar membrane 210 can be between about 8 μm and 12 μm. The planar membrane 210 has a thickness T less than the height $H_2$ of the step portion 204. The perforations 212 can have a diameter of between 10 nm and 100 nm. The ratio of perforated area to solid area can range between 35% perforated/65% solid to 45% perforated/55% solid. All ranges herein are inclusive. The perforations 212 can be uniformly made across the area of the planar membrane 210 as illustrated, but such uniformity is not required. The perforations 212 can vary in size so long as each perforation is within the stated range or each perforation can be the same size. FIGS. 3-5 illustrate the perforations 212 formed across an entire surface area of the planar membrane 210. FIG. 6 is an implementation of a three dimensional separator 300 having the same perimeter wall 202 and step portion 204 as in the three dimensional separator 200. However, the planar membrane 310 in FIG. 6 has a non-perforated border 320 adjacent the step portion 204, the non-perforated border 320 defining a perforated area. Perforations 312 are contained within the perforated area. The non-perforated border 320 further reduces or eliminates short circuiting of the unit cell.

Figure 7:
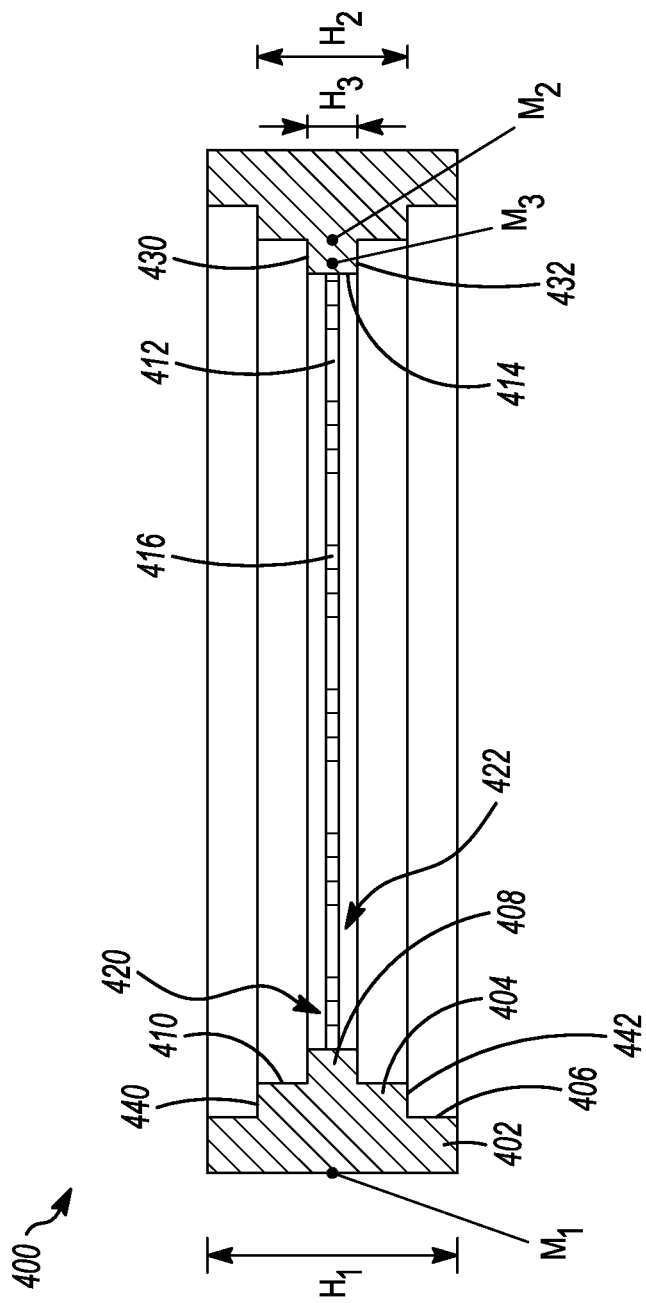
FIG. 7 is a plan view of yet another implementation of a three dimensional separator as disclosed herein.

FIG. 7 illustrates another implementation of a three dimensional separator 400 as disclosed herein. FIG. 7 is a perspective view of a cross-section of the three dimensional separator 400. A fourth stepped wall is removed for clarity. The three dimensional separator 400 has a perimeter wall 402 configured to extend around all four sides of the unit cell 100. A first step portion 404 extends from the perimeter wall 402 along an inner surface 406 of the perimeter wall 402. A midpoint $M_1$ of a height $H_1$ of the perimeter wall 402 aligns with a midpoint $M_2$ of a height $H_2$ of the first step portion 404. A second step portion 408 extends from an innermost surface 410 of the first step portion 404. A midpoint $M_3$ of a height $H_3$ of the second step portion 408 aligns with the midpoint $M_2$ of the height $H_2$ of the first step portion 404. The height $H_3$ of the second step portion 408 is less than the height $H_2$ of the first step portion 404.

A planar membrane 412 extends across an area defined by an innermost surface 414 of the second step portion 408. The planar membrane 412 is aligned with the midpoint $M_3$ of the height $H_3$ of the second step portion 408, the midpoint $M_2$ of the height $H_2$ of the first step portion 404, and the midpoint $M_1$ of the height $H_1$ of the perimeter wall 402. The planar membrane 412 has perforations 416 across its area.

The second step portion 408 and the planar membrane 412 form a first tray 420 on one side of the planar membrane 412 configured to hold electrolyte, and form a second tray 422 on an opposite side of the planar membrane 412 to hold additional electrolyte. The first step portion 404 and the second step portion 408 form a first intermediate ledge 430 on one side of the planar membrane 412 configured to hold positive electrode material, and the first step portion 404 and the second step portion 408 form a second intermediate ledge 432 on another side of the planar membrane 412 configured to hold negative electrode material. The perimeter wall 402 and the first step portion 404 on one side of the planar membrane 412 form a first perimeter ledge 440 configured to hold a current collector or a mat of carbon fiber reinforced with plastic, and the perimeter wall 402 and the first step portion 404 on another side of the planar membrane 412 form a second perimeter ledge 442 configured to hold another current collector or another mat of carbon fiber reinforced with plastic.

Also disclosed herein are supercapacitor unit cells 100 shown in FIG. 2 that are produced starting with an implementation of the three dimensional separators 200, 300, 400. Supercapacitors are also disclosed comprising more than one supercapacitor unit cells. The woven glass fiber mat 122, 124 is positioned between each pair of adjacent unit cells. The positive electrode tab 118 extends from each of the supercapacitor unit cells 100 between a positive electrode-side mat of carbon fiber reinforced with plastic and the adjacent woven glass fiber mat 124. A negative electrode tab 120 extends from the each of the supercapacitor unit cells 100 between a negative electrode-side mat of carbon fiber reinforced with plastic and its adjacent woven glass fiber mat 122.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A separator for use in a unit cell of an energy device, the separator comprising:
   a perimeter wall;
   a step portion extending from the perimeter wall along an inner surface of the perimeter wall, wherein a midpoint of a height of the perimeter wall is aligned with a midpoint of a height of the step portion, alignment of midpoints being in a perpendicular plane to the height of the perimeter wall and the height of the step portion;
   a planar membrane extending across an area defined by an innermost surface of the step portion, the planar membrane aligned with the midpoint of the height of the step portion; and
   perforations in the planar membrane;
   wherein the step portion is a first step portion, the separator further comprising:
   a second step portion extending from the innermost surface of the first step portion, wherein:
      a midpoint of a height of the second step portion is aligned with the midpoint of the height of the first step portion; and
      the height of the second step portion is less than the height of the first step portion.

2. The separator of claim 1, wherein each perforation has a diameter of between 10 nm and 100 nm.

3. The separator of claim 1, wherein the perforations are formed across an entire surface area of the planar membrane.

4. The separator of claim 1, wherein the planar membrane has a non-perforated border adjacent the step portion, the non-perforated border defining a perforated area.

5. The separator of claim 1, wherein the height of the perimeter wall is between 50 μm and 100 μm and the height of the step portion is between 15 μm and 35 μm.

6. The separator of claim 1, being a unitary piece.

7. The separator of claim 1, wherein the step portion and the planar membrane form a first tray on one side configured to hold electrolyte and negative active material, and form a second tray on an opposite side of the planar membrane to hold additional electrolyte and positive active material.

8. The separator of claim 1, wherein the perimeter wall and the step portion on one side of the planar membrane form a first perimeter ledge configured to hold a current collector or a mat of carbon fiber reinforced with plastic, and the perimeter wall and the step portion on another side of the planar membrane form a second perimeter ledge configured to hold another current collector or another mat of carbon fiber reinforced with plastic.

9. The separator of claim 1, wherein the second step portion and the planar membrane form a first tray on one side configured to hold electrolyte, and form a second tray on an opposite side of the planar membrane to hold additional electrolyte.

10. The separator of claim 1, wherein the first step portion and the second step portion form a first intermediate ledge on one side of the planar membrane configured to hold positive electrode material, and the first step portion and the second step portion form a second intermediate ledge on another side of the planar membrane configured to hold negative electrode material.

11. The separator of claim 1, wherein the perimeter wall and the first step portion on one side of the planar membrane form a first perimeter ledge configured to hold a current collector or a mat of carbon fiber reinforced with plastic, and the perimeter wall and the first step portion on another side of the planar membrane form a second perimeter ledge configured to hold another current collector or another mat of carbon fiber reinforced with plastic.

12. A supercapacitor unit cell, comprising:
the separator of claim 1, wherein:
the step portion and the planar membrane form a first tray on one side of the planar membrane and form a second tray on an opposite side of the planar membrane; and
the perimeter wall and the step portion on one side of the planar membrane form a first perimeter ledge, and the perimeter wall and the step portion on another side of the planar membrane form a second perimeter ledge;
positive electrode material and electrolyte in the first tray;
negative electrode material and additional electrolyte in the second tray; and
a mat of carbon fiber reinforced with plastic supported on each of the first perimeter ledge and the second perimeter ledge.

13. A supercapacitor, comprising:
more than one of the supercapacitor unit cell of claim 12;
a woven glass fiber mat positioned between each pair of adjacent unit cells;
a positive electrode tab extending from each supercapacitor unit cell between a positive electrode-side mat of carbon fiber reinforced with plastic and an adjacent woven glass fiber mat; and
a negative electrode tab extending from the each supercapacitor unit cell between a negative electrode-side mat of carbon fiber reinforced with plastic and another adjacent woven glass fiber mat.

14. A separator for use in a unit cell of an energy device, the separator comprising:
a perimeter wall configured to form a seal around edges of layers forming the unit cell;
a step portion extending from an inner surface of the perimeter wall, wherein a height of the perimeter wall is greater than a height of the step portion;
a planar membrane extending across an area defined by the step portion, the planar membrane aligned with a midpoint of the height of the step portion, the planar membrane having a thickness less than the height of the step portion; and
perforations in the planar membrane,
wherein the separator is a unitary piece of electrically insulating but ionically conducting material, and
the step portion is a first step portion, the separator further comprising:
a second step portion extending from an innermost surface of the first step portion.

15. The separator of claim 14, wherein each perforation has a diameter of between 10 nm and 100 nm.

16. The separator of claim 14, wherein the perforations are formed across an entire surface area of the planar membrane.

17. The separator of claim 14, wherein the planar membrane has a non-perforated border adjacent the step portion, the non-perforated border defining a perforated area.

18. A separator for use in a unit cell of an energy device, the separator comprising:
a perimeter wall;
a step portion extending from the perimeter wall along an inner surface of the perimeter wall, wherein a midpoint of a height of the perimeter wall is aligned with a midpoint of a height of the step portion;
a planar membrane extending across an area defined by an innermost surface of the step portion, the planar membrane aligned with the midpoint of the height of the step portion; and
perforations in the planar membrane,
wherein the step portion is a first step portion, the separator further comprising:
a second step portion extending from the innermost surface of the first step portion, wherein a midpoint of a height of the second step portion is aligned with the midpoint of the height of the first step portion, and the height of the second step portion is less than the height of the first step portion, and
wherein the perimeter wall and the first step portion on one side of the planar membrane form a first perimeter ledge configured to hold a current collector or a mat of carbon fiber reinforced with plastic, and the perimeter wall and the first step portion on another side of the planar membrane form a second perimeter ledge configured to hold another current collector or another mat of carbon fiber reinforced with plastic.

* * * * *